(No Model.) 9 Sheets—Sheet 1.
T. E. MONTAGUE.
MACHINE FOR BENDING VEHICLE SHAFTS.
No. 473,329. Patented Apr. 19, 1892.
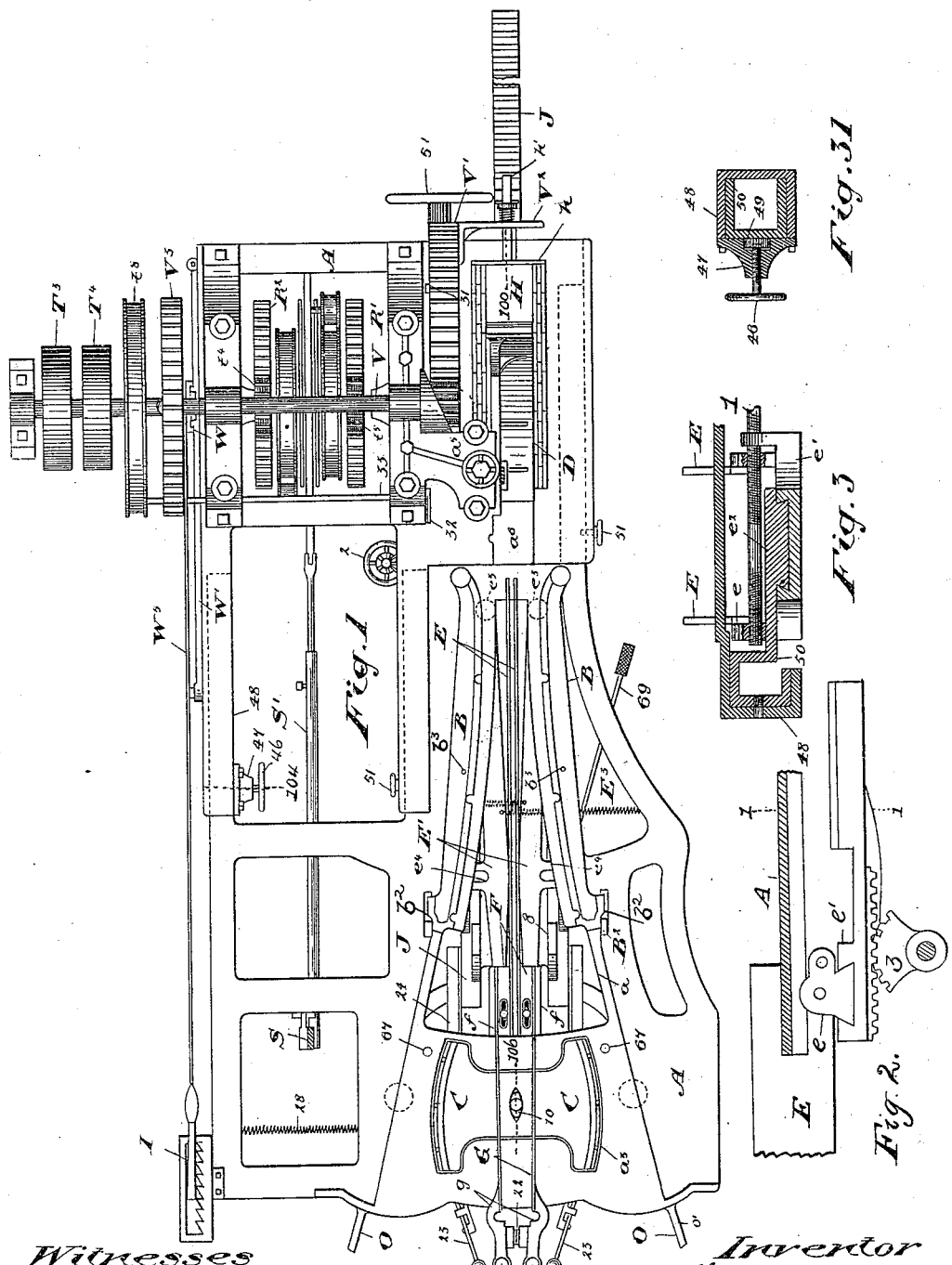

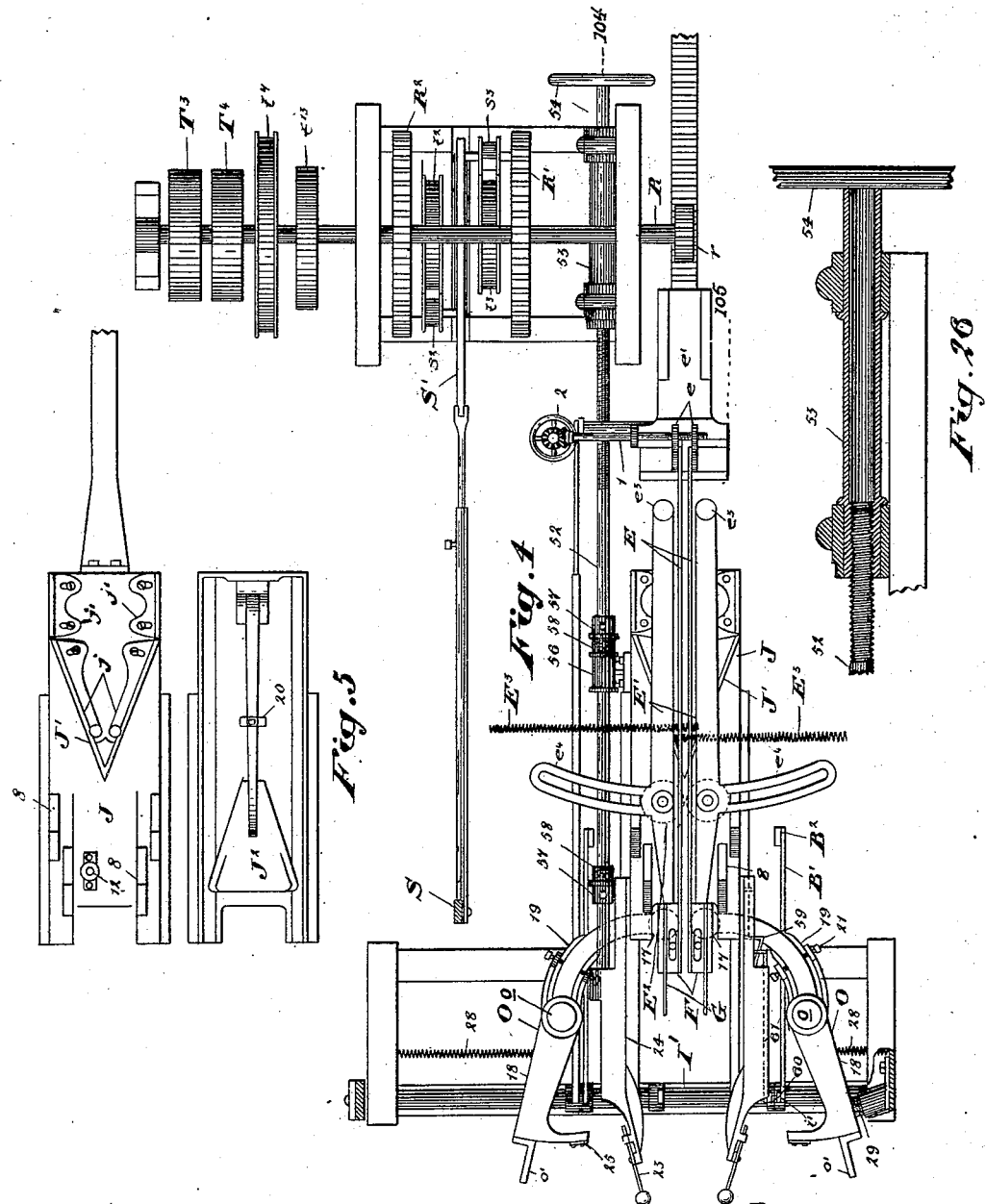

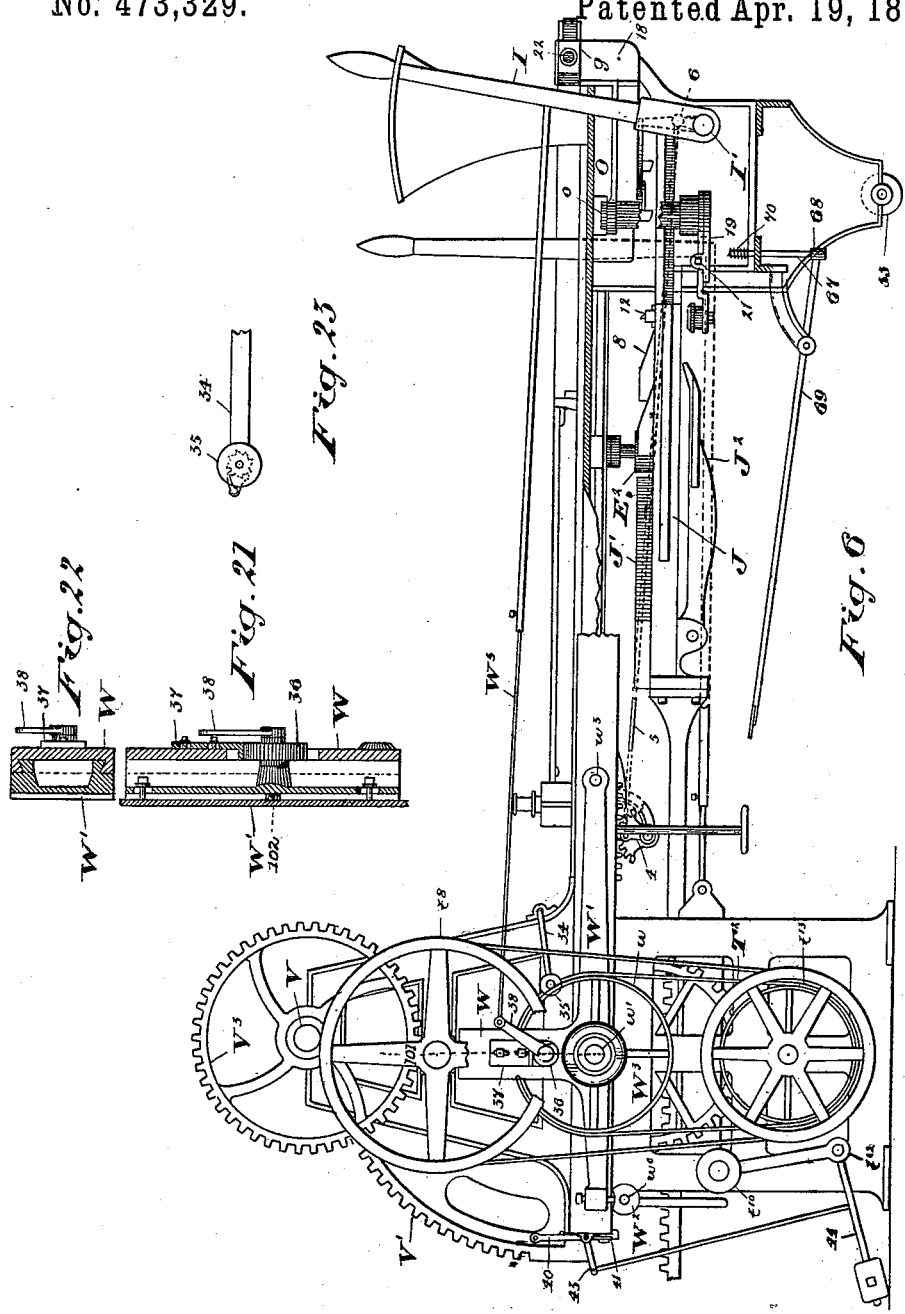

(No Model.)  9 Sheets—Sheet 4.

T. E. MONTAGUE.
MACHINE FOR BENDING VEHICLE SHAFTS.

No. 473,329. Patented Apr. 19, 1892.

Witnesses  
J. Edw. Maybee  
H. G. McMillan

Inventor  
Thos. E. Montague  
by Donald C. Ridout & Co  
Attys.

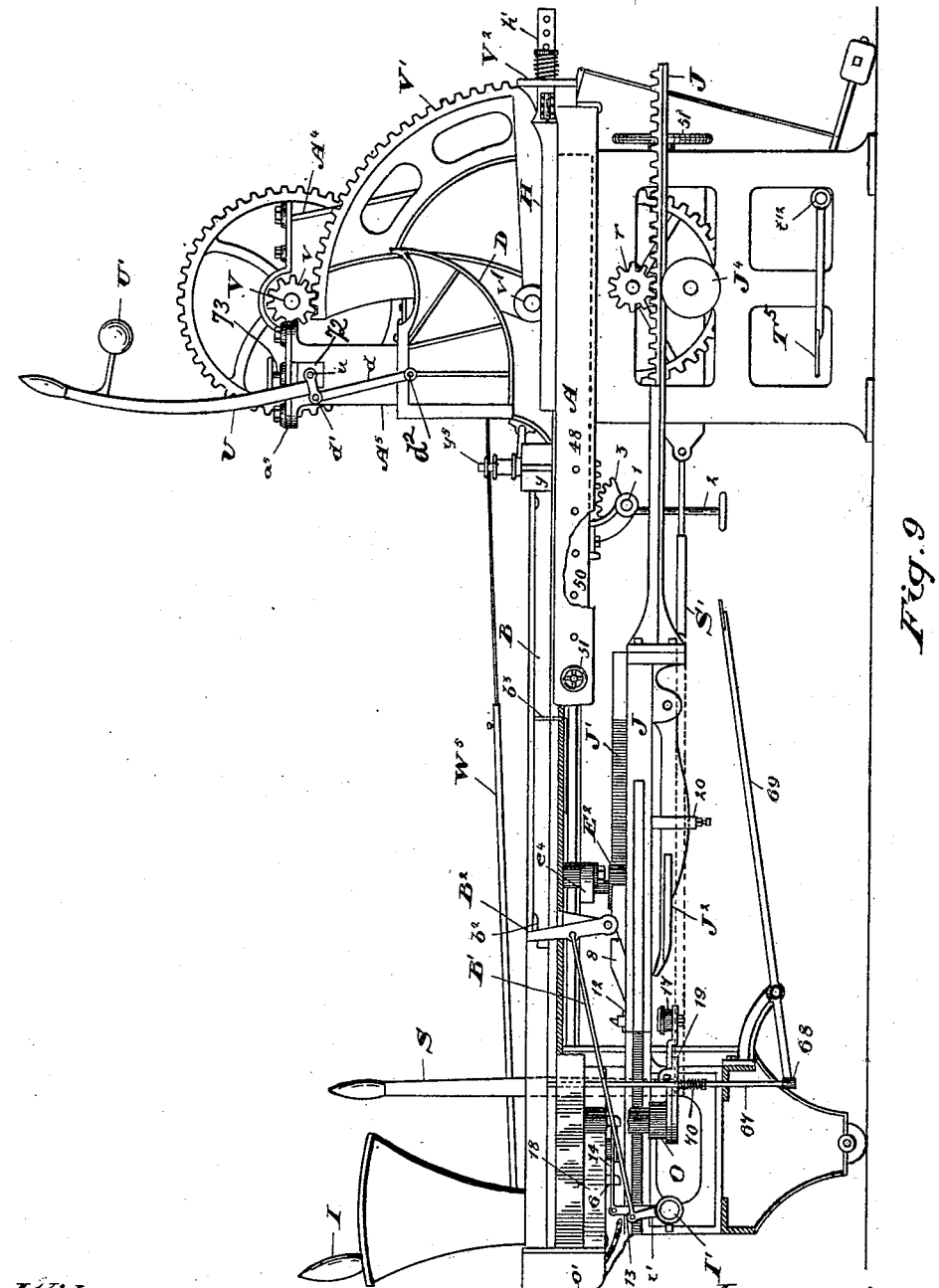

(No Model.) 9 Sheets—Sheet 6.
T. E. MONTAGUE.
MACHINE FOR BENDING VEHICLE SHAFTS.
No. 473,329. Patented Apr. 19, 1892.
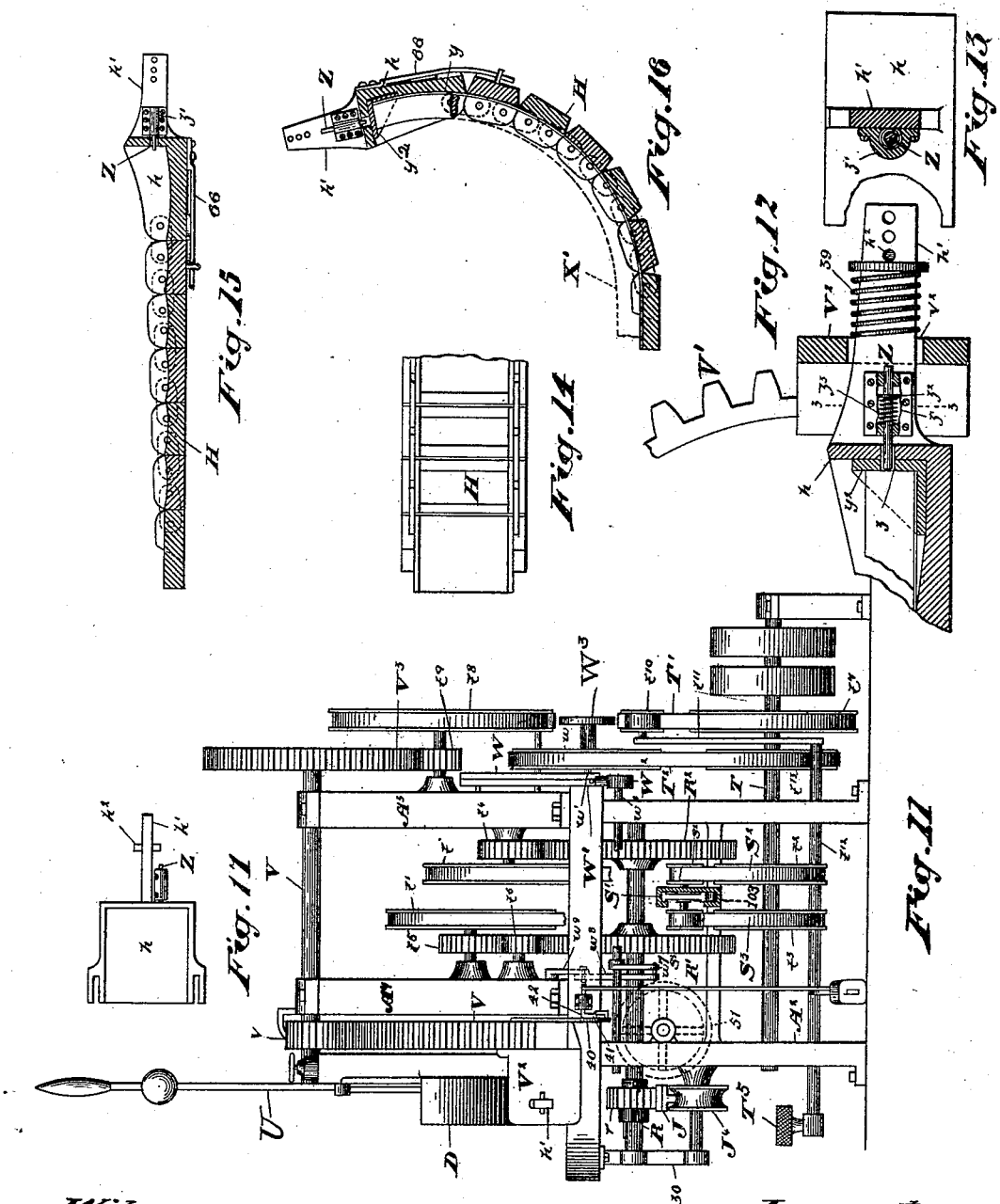
Witnesses
J. Edw. Maybee
W. G. McMillan
Inventor
Thos. E. Montague
by Donald C. Ridout & Co.
Attys.

(No Model.) 9 Sheets—Sheet 7.
T. E. MONTAGUE.
MACHINE FOR BENDING VEHICLE SHAFTS.
No. 473,329. Patented Apr. 19, 1892.
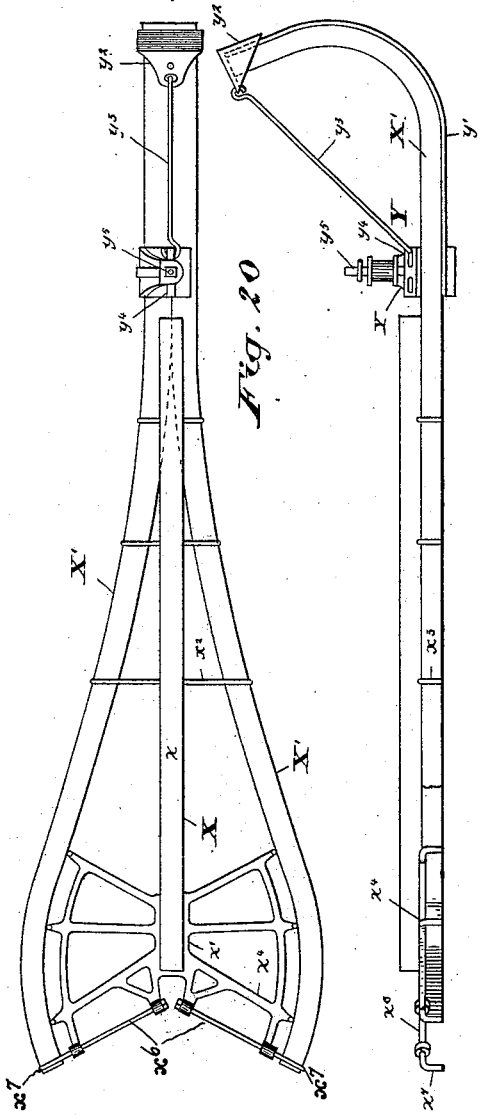
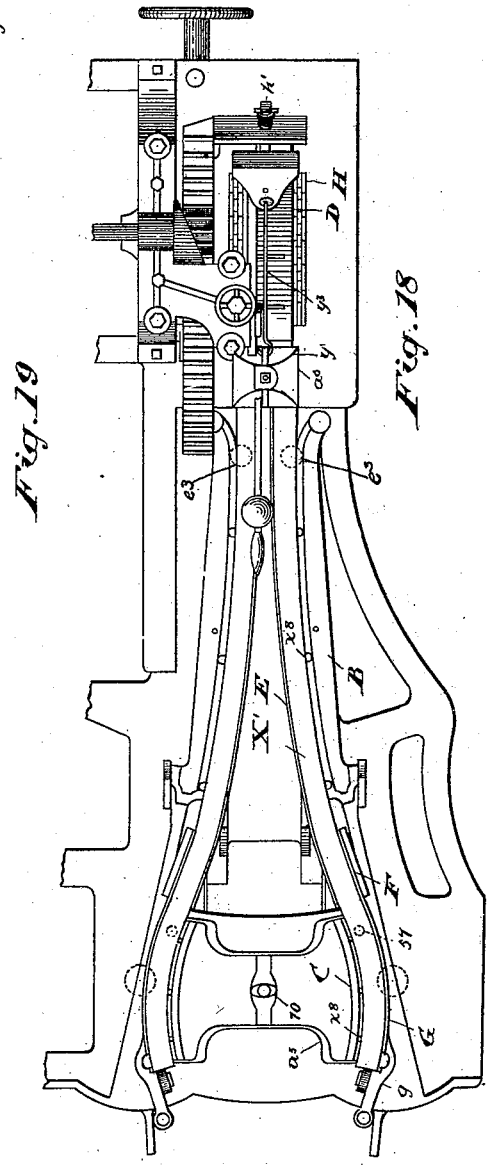

(No Model.)　　　　　　　　　　　　　　　　　　9 Sheets—Sheet 8.
T. E. MONTAGUE.
MACHINE FOR BENDING VEHICLE SHAFTS.

No. 473,329.　　　　　　　　　Patented Apr. 19, 1892.

Witnesses　　　　　　　　　　　　　　　Inventor

J. Edw. Maybee　　　　　　　　　　　Thos. E. Montague
N. G. McMillan　　　　　　　　　by Donald C. Ridout & Co.
　　　　　　　　　　　　　　　　　　　Attys.

(No Model.) 9 Sheets—Sheet 9.
T. E. MONTAGUE.
MACHINE FOR BENDING VEHICLE SHAFTS.
No. 473,329. Patented Apr. 19, 1892.
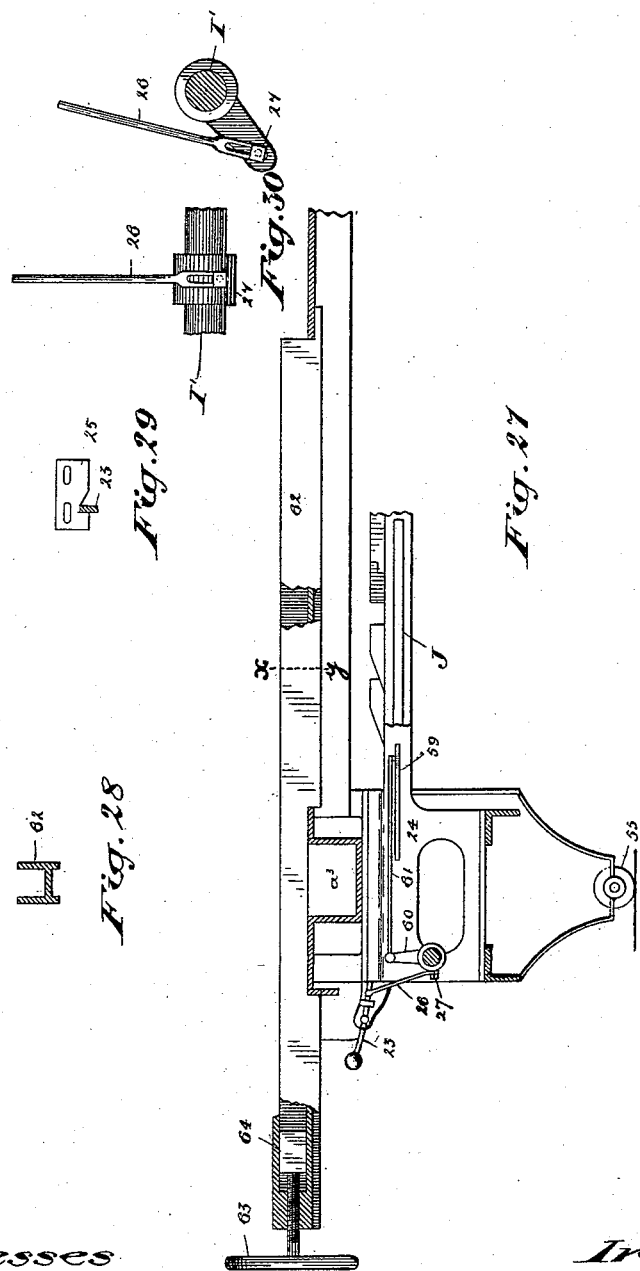
Witnesses
J. Edw. Maybee
H. G. McMillan
Inventor
Thos. E. Montague
by Donald C. Ridout & Co.
Attys.

UNITED STATES PATENT OFFICE.

THOMAS E. MONTAGUE, OF WEST LORNE, CANADA.

MACHINE FOR BENDING VEHICLE-SHAFTS.

SPECIFICATION forming part of Letters Patent No. 473,329, dated April 19, 1892.

Application filed March 30, 1891. Serial No. 387,052. (No model.)

*To all whom it may concern:*

Be it known that I, THOMAS EDWARD MONTAGUE, manufacturer, of the village of West Lorne, in the county of Elgin, in the Province of Ontario, Canada, have invented a certain new and Improved Machine for Bending Vehicle-Shafts, of which the following is a specification.

My invention relates to machines for bending the shafts or thills and poles or tongues of carriages or other vehicles, and has for its object to provide a machine embodying many important improvements on a machine of like character for which Letters Patent of the United States No. 415,919 were granted to me November 26, 1889, whereby the machine is rendered more simple and automatic, thus enabling the shafts to be bent with greater economy of time and labor.

The invention consists in certain novel features of construction and combinations of parts of the shaft-bending machine, all as hereinafter described and claimed.

Reference is to be had to the accompanying drawings, forming a part of this specification, in which similar letters and numerals of reference indicate corresponding parts in all the figures.

Figure 7:
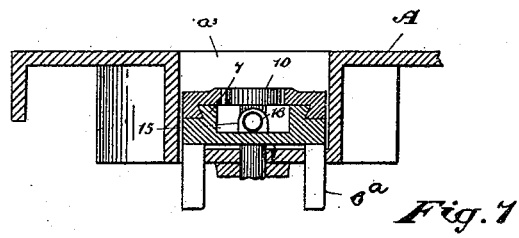
Figure 8:
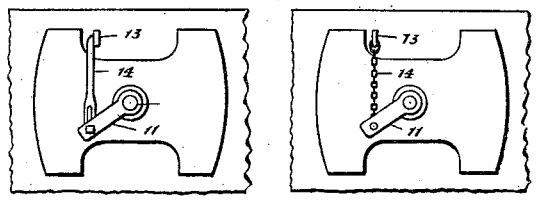
Figure 10:
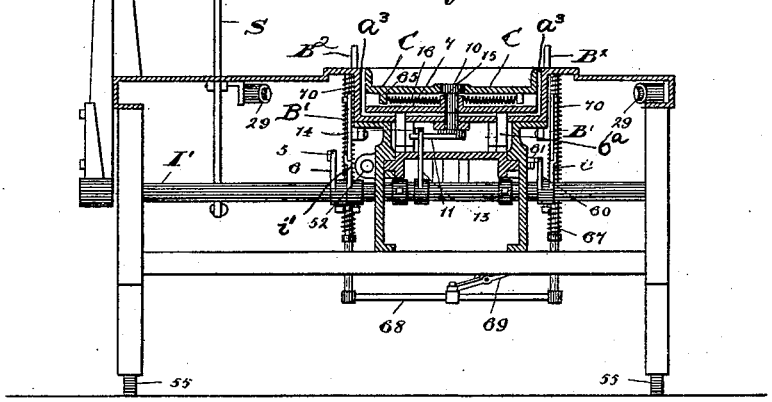
Figure 24:
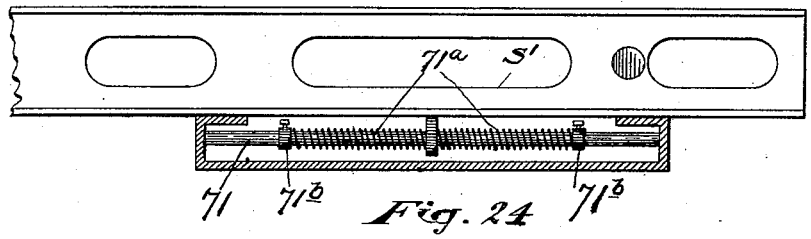
Figure 25:
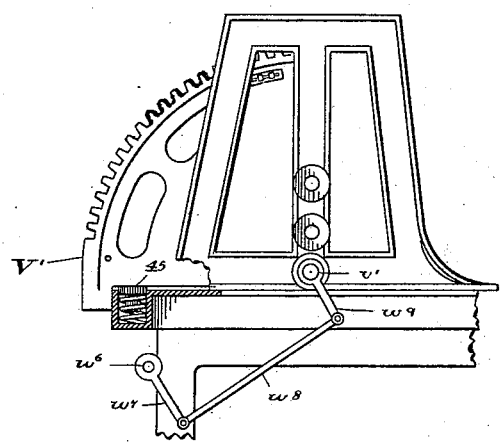

Figure 1 is a plan view of my improved shaft-bending machine. Fig. 2 is a detail side elevation, partly in section, on line 105, Fig. 4, and illustrates the connection of the rear ends of the shaft-bending bars to the bed or table of the machine. Fig. 3 is a detail view in cross-section on the line 1 1 in Fig. 2. Fig. 4 is a plan view of the operative mechanism arranged under the bed of the machine with parts in horizontal section. Fig. 5 is a top and bottom view of the wedge-bar of the machine. Fig. 6 is an elevation of the left-hand side of the machine partly broken away and in section. Fig. 7 is a vertical sectional view through the line 106, Fig. 1, showing the shaft-point former. Fig. 8 is a detail of cam-lever on bottom of former. Fig. 9 is an elevation of the right-hand side of the machine partly broken away and in section. Fig. 10 is an elevation of the front end of the machine, partly in section, through the formers C C. Fig. 11 is an elevation of the rear or power end of the machine with parts broken away. Fig. 12 is an enlarged sectional side elevation of the rear or free end of the heel-bending chain and adjacent parts, taken on the line 100, Fig. 1. Fig. 13 is a detail sectional view taken on the line 3 3 in Fig. 12. Fig. 14 is a plan view of the inner end of the heel-bending chain. Fig. 15 is a sectional side view of the heel-bending chain laid out flat on the line 100, Fig. 1. Fig. 16 shows the heel-bending chain and the heel portion of the shafts and their clamp-iron therein as when bent up by the segmental rack and gearing in longitudinal section on the line 100 in Fig. 1. Fig. 17 is a plan view of the outer or box link of the heel-bending chain. Fig. 18 is a detail plan view of parts of the machine with a pair of shafts bent and the heel-clamp applied. Fig. 19 is a side elevation of a pair of bent shafts with both heel and front clamps applied. Fig. 20 is a plan view of the pair of bent shafts and applied clamps. Fig. 21 is a vertical section on line 101 in Fig. 6 of back-action lever-slide. Fig. 22 is a cross-section on line 102 of Fig. 21. Fig. 23 is a detail of ratchet-brake. Fig. 24 is a detail of shipper-bar and spring for holding it in its normal position, partly in section on line 103 in Fig. 11. Fig. 25 is a detail of segmental rack and connections with part broken away. Fig. 26 is a longitudinal section of adjusting-screw on line 104, Fig. 4. Fig. 27 is a sectional detail of end of machine with pole attachment in place. Fig. 28 is a cross-section through *x y* of pole attachment. Fig. 29 is a detail of adjustable column-lever latch. Fig. 30 is a detail of latch-tripping rod and connection. Fig. 31 is a cross-sectional detail on the line 104 in Fig. 1.

A is the metal bed or table of the machine suitably designed.

The machine has an opposing pair of formers B B, against the curved inner faces of which the central or body parts of a pair of vehicle-shafts are bent, an opposing pair of formers C C, against the curved outer faces of which the points of a pair of shafts are bent, and a former D, against the face of which the heels or butt-ends of the pair of shafts are bent, suitable clamps being provided for holding the bent pair of shafts into shape while they dry or set. The pair of shafts is bent directly by means of flexible plates or bars E E, which press the shafts to the formers B B and are connected to blocks F F, to which are held the flexible plates or bars G G, which press the shafts to the formers C C, and the last or heel bend is given to the shafts by a flexible chain H, which presses the shafts to the former D. I will particularly describe these formers and their operative mechanism in the order above named, as follows: The first-bend formers B B are substantially like the first-bend formers shown in my prior United States patent, No. 415,919. The rear ends of the bars E project under the bed A and are attached to nuts $e$, sliding transversely in a dovetail groove formed in the block $e'$, which itself slides longitudinally on a guide $e^2$, attached to or forming part of the frame of the machine. These nuts $e$ are adjusted closer together or farther apart to suit shafts of different thicknesses by the action of the right and left hand threaded screw 1, operated by suitable gearing, as shown, from the hand-wheel 2.

A segmental rack 3 is journaled on a bracket connected to the bed of the machine and engages with a rack formed on the bottom of the block $e'$. An arm 4 is connected to the shaft of the rack 3 and is connected by the rod 5 to an arm 6 on the shaft $I'$, which carries a lever I, which may be rocked to operate the segmental rack 3 and shift the block $e'$ and bending-bars E lengthwise of the machine. This rock-shaft $I'$ also carries other tappet-arms $i'$ $i'$, to which are connected the front ends of rods or bars $B'$ $B'$, the rear ends of which are attached to upright levers $B^2$ $B^2$, which are fulcrumed at their lower ends to brackets on the bed A and project through slots in the bed up behind beveled faces $b^2$ $b^2$ at the front ends of the formers B B, thus causing the same movement of the lever I, which carries the bending-bars E E rearward, to force the free ends of the formers toward each other a little—say one-half or three-quarters of an inch—prior to the bending of the shafts to the formers by the bars. Springs $b^3$, fixed at one end to the under side of the bed A and entering the formers B by their free upturned end, normally spread the formers apart against the upper ends of the levers $B^2$. Two bars $E'$ $E'$ are pivoted to the under side of the bed A at $e^3$ $e^3$ near the slide-block $e$, and these bars project toward the front end of the machine, and to their forward ends the bending-bar blocks F F are held by bolts which pass through lengthwise slots of the blocks, which allows free endwise motion of the blocks and the plates E E by the guide $e^2$, and as the bending-plates G G are also held to the blocks they will also be shifted endwise at the same time to cause the end blocks $g$ $g$ on the plates G G to clamp the shafts endwise between them and the box-link $h$ at the outer end of the chain H, which gives the heel-bend to the shafts. The blocks F F are each provided with an outer upwardly-projecting flange $f$, to which the rear end of the corresponding plate G is fixed, and the rear ends of the corresponding bending-plates E are fixed to the inner edges of the blocks and project above their faces, through which their holding and guide bolts pass, so that the shafts when resting on the bed A also lie on the blocks F between the adjacent ends of the bending-plates E G, and the tops of these plates are about level with the tops of the formers B B and will also lie about level with the tops of the formers C C when the latter are raised to operative positions from recess $a^3$ in the bed A which they normally occupy. The bending-plates G G are adapted to pass over the lowered formers C C, while the first bend of the shafts to the formers B B is being made. The bed A has an opening $a$, allowing free lateral movement of the bending bars or plates E G. The bars $E'$ $E'$ are provided with curved and slotted lateral arms $e^4$ $e^4$, which loosely receive guide-bolts fixed to the under side of the bed, and said bars $E'$ $E'$ also carry rollers $E^2$ $E^2$, between which the wedge $J'$ on the bar J enters for forcing the two bars E, their blocks F, and the bars G apart and bending the two shafts by the bars E E up to the formers B B as the wedge-bar J travels toward the front end of the machine. Springs $E^3$ $E^3$, held to the bed A, act on the bars E to restore the bars $E'$ E to normal positions when the bent shafts are removed from the machine.

The point-formers C C are contained normally in a recess $a^3$, formed below the bed of the machine. Each former C works in a dovetailed groove formed in a plate 7. This plate 7 has four legs $6^a$ projecting through the bottom of the recess $a^3$ in the path of the wedges 8, formed on the upper side of wedge-bar J. By the action of these wedges the plate is elevated, raising the formers C to the working position. A short vertical shaft is journaled in the bottom of the recess $a^3$ and carries at its upper end a cam 10 and at its lower end a lever 11. On the wedge-bar J is a spring-latch 12, shaped as shown in Fig. 6. This latch 12 is placed so that its beveled face will come in contact with the lever 11 when the wedge-bar J moves forward, and consequently the latch 12 will be forced downward, allowing it to pass under lever 11, when it immediately resumes its normal position and engages with the lever 11 on the return stroke of the wedge-bar J. As the formers C have been elevated previously by the action of the wedges 8, the formers C are spread to the position shown in Fig. 18, resting on the bed of the machine by the return stroke of the wedge-bar J, operating the lever 11 through the latch 12 and thus revolving the cam 10 a quarter-circle, as shown. The lever 11 is connected to an arm 13 on the shaft $I'$ by the rod 14, so that when the lever I is returned to its original position it draws back the lever 11 and returns the cam to its normal position. The rod 14 is slotted, as shown, to allow the lever to be moved without any motion of the rock-shaft I'. A chain connection between rod 13 and lever 11 will answer the same purpose and would perhaps be preferable. On the lower side of each former C is a lug 65, connected by a spring 16 to the lug 15 on the plate 7, so that when the cam 10 resumes its normal position the springs 16 draw the formers C together and they drop into their normal position in the recess $a^3$. The formers C are raised and spread immediately after the first bend has been given to the shafts and while the shaft-points are spread apart outside the formers. This spreading movement is followed by the bending of the shaft-points to the raised former C by the swinging arms of the column-levers O. These levers O are journaled at $o$ to the under side of the bed or a boss thereon. The upper arm 18 of each lever extends forward and upward and engages at the proper time with the outer end or head $g$ of each of the bars G. The lower arm 19 of each lever extends backward and inward, as shown, in the path of the wedge $J^2$, pivoted under the wedge-bar J. Owing to the shape of the wedge $J^2$ it rises over the rollers 17, pivoted on the lower arms 19 of the column-levers O as it moves forward; but as the wedge-bar returns the small end of the wedge $J^2$ enters between the rollers and spreads the arms 19 outward, thus throwing inward the arms 18, the outer ends of which engage with the friction-rollers on the heads $g$ of the bars G and force them toward each other, and thus give the second lateral bend to the shafts by forcing them against the formers C. A strap 20 prevents the pivoted wedge $J^2$ from falling too low. The lower arm 19 of each column-lever O is in two parts, as shown, the lower rigidly connected to the column of the lever and the upper connected to a sleeve on the column. This upper arm may be adjusted laterally by set-screws 21, as shown, to regulate the inward throw of the bars G to provide for different thicknesses of shafts. The heads $g$ have rubber cushions 22 to act as buffers when the bars G resume the normal position. In order to hold the upper arms 18 firmly against the heads $g$ when the wedge-bar J has returned to its normal position, weighted latches 23 are pivoted on upward extensions of the guide-frame 24, in which the wedge-bar J slides, which engage with adjustable catches 25, (see Figs. 4 and 29,) formed on or attached to the inner sides of the arms 18 of column-levers O. A rod 26 (see Figs. 27 and 30) is connected at one end to the latch 23 and at the other to a short stud 27 on the rock-shaft I', so that a forward movement of the lever I will draw the latch free from the catch and allow the column-levers O to resume their normal position. The rods 26 are slotted, as shown, in order to allow the latches 23 to engage without any motion of the rock-shaft I'. The column-levers O are drawn to their normal position by springs 28, suitably connected to the frame of the machine. Rubber cushions 29 are provided to ease the shock of the return.

The wedge-bar J (see Fig. 5) has a main body portion, on which the wedges J', $J^2$, and 8 are fixed, and a stem forming a rack, into which a pinion of the driving-gearing meshes to reciprocate the bar, as presently explained. The sides $jj$ of the wedge J' are pivoted near the apex of the wedge, and the rear ends of said sides are held to the wedge-bar by screws or bolts passing through slotted lugs on the sides, which may thus be nicely adjusted to govern the width of the wedge as varying thicknesses of shafts may require. Behind the adjustable sides of the wedge J' the wedge-bar is provided with adjustable side plates $j'$, which may be adjusted to correspond with the sides $jj$ of the wedge J' by means of bolts or screws passing through slotted lugs. These side plates $j'$ hold the bars E outward to any extent to which they may have been spread by the wedge, and thus give ample time for the raising and spreading of the formers C. The small wedges 8 also have a straight portion to hold up the plate 7, carrying the formers C, until they have been spread by the action of the latch 12. The wedge $J^2$ is pivoted on the under side of the wedge-bar, as shown. The wedge-bar J is operated by a pinion $r$ on a transverse shaft R, suitably journaled in the rear legs of the machine. A grooved guide-pulley $J^4$, journaled between the rear legs of the machine and the hanger 30, receives loosely a tongue or rib formed on the under side of the wedge-bar J below the rack and the pinion $r$ engaging with it and sustains the rear end of the bar, the front part of which is formed to slide in suitable grooves in the guide-frames 24.

The wedge-bar J has a lug 56 (see Fig. 4) attached to one side. This lug slides on the shaft 52, hereinafter more particularly described. On this shaft are two adjustable stops 57, provided with rubber cushions 58, which limit the reciprocating motion of the wedge-bar J. Attached to the side of the guide-frame 24 is a spring 59. (See Fig. 4.) The end of this spring passes through a hole in said guide-frame, and when the lug on the wedge-bar J strikes the front stop 57 the end of the spring drops behind the end of the slide on the side of the wedge-bar and prevents the elasticity of the rubber cushion from throwing the wedge-bar forward, so as to interfere with the rollers $E^2$. On the rock-shaft I' is an arm 60, to which is connected a rod 61, the other end of which is adapted to enter the wedge-shaped bend near the end of the spring 59, so that when the shaft I' is rocked forward at the completion of the bending of the shafts the end of the rod 61 is drawn forward between the spring 59 and the guide-frame 24, thus withdrawing the end of the spring 59 from its position in front of the wedge-bar J. When the wedge-bar is released, the tension of the spring-cushion on the stop 57 throws it forward, so that the spring cannot again drop in front of it when the lever I is thrown backward at the commencement of a new operation.

The shaft R is journaled in the rear of the machine, and on it are placed two gear-wheels R' R².

A shipper-bar S', which at its rear end is fitted in suitable guideways formed on the cross-bars on the frame of the machine, carries two belt-tightening grooved pulleys $s^2 s^3$, which are adapted, respectively, to tighten loose belts $S^2 S^3$, which run from grooved pulleys $t^2 t^3$ on the main driving-shaft T to upper grooved pulleys or wheels $t t'$. The pulley $t$ is journaled on a short shaft which is fixed in the left-hand standard $A^3$ of the machine-frame and carries fixedly a pinion $t^4$, which meshes with the gear-wheel $R^2$, and the pulley $t'$ is journaled on a short shaft which is fixed to the opposite or right-hand standard $A^4$ of the frame and carries fixedly a pinion $t^5$, which meshes with an idler-pinion $t^6$, journaled on a shaft in the standard $A^4$ and which meshes with the gear-wheel R'. With this construction, and as the lever S is drawn forward or toward the operator, the shipper-bar S' will be forced rearward to carry the pulley $s^2$ against the belt $S^2$ and tighten it to cause rotation of the pulley $t$ and pinion $t^4$ to revolve the wheel $R^2$, and consequently the shaft R and its pinion $r$, to impart a forward movement to the wedge-bar J for spreading the bars E' E to give the first bend to the shafts against the formers B B, and as the lever is pushed backward the shipper-bar S' will be drawn forward to cause the pulley $s^3$ on the shipper to tighten the belt $S^3$ and rotate the pulley $t'$ from the pulley $t$ and consequently turn the pinion $t^5$ and the idler $t^6$ to rotate the gear-wheel R', shaft R, and pinion $r$ in the reverse direction for giving the return or rearward movement to the wedge-bar J, and thereby cause its wedge $J^2$ to actuate the column-levers O O and the outspread bars G G to give the second bend to the shafts against the raised formers C C.

I will next describe the heel-former D and its operating mechanism and connections as follows: The former itself is substantially like the one shown in my prior patent and is hung by a link $d$ (see Fig. 9) from a pivot $d'$ in the end of a lever U, which is fulcrumed by a pin $u$ to a block 72, sliding in a vertical standard $A^5$, and near its outer end is provided with a counter-weight U'. The former D is fitted loosely by a dovetail joint to the vertical standard $A^5$, held to the bed A and braced by a suitable bar or link $a^5$ (see Fig. 1) to the top of the standard $A^4$. When the lever U is lowered by hand to depress the former D to the pair of shafts on the bending-chain H, the pivot $d'$ will pass a line which would bisect the lever and former-pivots $u\, d^2$, and thus lock the former securely against tendency to lift while the heels of the shafts are being bent up around it by the chain H, as hereinafter described.

A transverse shaft V is journaled in the top of the standards $A^4$ and carries fixedly a pinion $v$, which meshes with a segmental rack V', journaled by a short shaft $v'$ to the standard $A^4$. A lug or bracket $V^2$, (see Fig. 12,) fixed to the lower rear corner of the rack V', is provided with a slot $v^2$, which loosely receives the rearwardly-projecting stem $h'$ of the outer or box link $h$ of the shaft-bending chain H to cause the bending of the chain by the swinging of the rack. The shaft V is rotated from the main driving-shaft T by a belt T', which runs from a grooved pulley $t^7$ on said shaft to a larger grooved pulley $t^8$, whose shaft is journaled in the frame-standard $A^3$ and carries fixedly a pinion $t^9$, which engages a gear-wheel $V^3$ on the shaft V. The belt T' is normally loose, but may be tightened by pressure against it of a pulley $t^{10}$, which is journaled on an arm $t^{11}$, fixed to a shaft $t^{12}$, journaled in the frame-legs $A^2$ and provided with a treadle $T^5$, which when depressed by the operator's foot tightens the belt T', and thereby causes the shaft V and pinion $v$ to rotate over backward and turn the rack V', and thereby carry the outer end of the chain H upward to bend the heel portions of the shafts to the lowered former D.

The segmental rack V' carries near its edge, as shown in Fig. 1, an adjustable lug 31, which comes in contact with the arm 32, fixed on a shaft 33, when the rack has revolved sufficiently far forward. This shaft 32 is journaled in standards $A^3 A^4$ and carries at its other end an arm 34, (see Fig. 23,) on which a ratchet-brake 35 is journaled. When the segmental rack V' strikes the arm 32, the brake 35 is forced against the pulley $t^8$ and effectually stops it, and through its connections the segmental rack V', thus avoiding any accidents through inattention on part of operator of foot-lever $T^5$.

It will be observed that the arm 34 (see Fig. 23) has a pawl engaging with the ratchet on the side of the ratchet-brake 35. This pawl prevents any motion of the brake when stopping the pulley $t^8$, but offers no obstruction to the reversing of the said pulley, which it would were the ratchet-brake solid with the arm 34, as the pulley $t^8$ naturally commences to reverse before the segmental rack $v'$ disengages from the arm 32. The reverse motion is given to the shaft V for lowering the rack V' and bending-chain H by a grooved pulley $t^{13}$ on the driving-shaft T, from which a loose belt $T^2$ runs to a grooved pulley $w$, which is loose on a shaft $w'$, cast in the slide W, (see Fig. 6,) which is dovetailed on a lever W', fulcrumed at $w^3$ to the side of the machine-bed A, and at its rear end rests by gravity on top of a cam $W^2$, operated from the shaft $v'$ of the segmental rack V', as presently explained. The shaft $w'$ of sliding block W also supports a friction-wheel $W^3$, which is fast to the grooved pulley $w$ and adapted to be pressed against the lower face of the pulley $t^8$, from which the shaft V may be rotated in either direction through the gearing $t^9$ $V^3$.

The slide W works on a dovetailed guide formed on the lever W'. (See Figs. 21 and 22.) A cam 36 is journaled in the lever W' and bears against an adjustable lug 37 on the slide W. This cam has an arm 38, to which is connected the rear end of a rod $W^5$, which is connected to the lever I at a considerable distance from its shaft I', so that as this lever is shifted to draw the levers $B^2$ from behind the formers B and to move the shaft-bending bars E G forward to release the shafts from the formers the cams 36 will be rocked to raise the slide W on the lever W' and carry its friction-wheel $W^3$ fully up to the pulley $t^8$ and at the same time tighten the slack belt $T^2$ to reverse the motion of the pulley $t^8$ and the shaft V for lowering the rack V' and chain H.

Prior to the final lifting of the friction-wheel $W^3$ to the pulley $t^8$ by the independent movement of the slide W through the medium of the cam 36, journaled on the lever W', which then rests on the cam $W^2$, the lever W' is itself lifted, so as to raise the slide W to carry its friction-wheel $W^3$ upward about one-half the normal distance between the friction-wheel and the pulley $t^8$, the balance of the upward movement being effected by the shifting of the lever I, as above described. The initial upward movement of the friction-wheel is caused by the rotation of the cam $W^2$ beneath the lever W'. This cam is fixed to a shaft $w^6$, which is journaled in the frame A and has a fixed radial arm $W^7$, to which is connected one end of a rod $w^8$, the other end of which is connected to the extremity of a crank-arm $w^9$, (see Fig. 25,) which is fast to the shaft or axis $v'$ of the segmental rack V', which raises and lowers the heel-bending chain H. With this construction the cam $W^2$ is turned to lift the back end of the lever W' from the shaft $v'$ of the segmental rack V' as said rack is swung forward to bend the shafts to the former D. Hence while the heel-bend is given the shafts the slide W will also be lifted with the lever W', as the latter when raised by the cam $W^2$ lifts on the cam $W^4$ of the slide W, and consequently lifts the friction-wheel $W^3$ thereof about half-way toward the face of the pulley $t^8$, ready to be pressed to it subsequently by the action of the cam 36, operated by the rod $W^5$ and lever I, as above described. As the rack V' is lowered, the smaller radius of the cam $W^2$ will again be turned uppermost by the crank and rods $w^9$ $w^8$ $w^7$ to allow the slide W and lever W' to fall and lower the friction-wheel $W^2$ from the pulley $t^8$ and at the same time slack off the belt $T^2$, so that the pulley $t^{13}$ has no driving effect on it. The peculiar operation of the slide W and lever W' and their cams or eccentrics $W^2$ 36 is important. It is obvious that if the friction-pulley $W^3$ were hung directly on the lever W', so as to be pressed by it to the pulley $t^8$, the segmental rack V' would start to run back or down without allowing time for application of the retaining-clamps to the bent shafts, or the rack might be run back even before the heel-bend of the shafts was fully made, and on the other hand, if the slide W alone were used by fulcruming it directly to the bed A and having its cam 36 act therein to lift the friction-wheel $W^3$ to the pulley $t^8$, the friction would be on while the segmental rack V' was down and the machine would jam. It is manifest, therefore, that by providing the slide W and lever W' and their cams and connections above described and lifting the friction-wheel $W^3$ half-way by the lever W', operated by the cam $W^2$, turned by the rising rack V', the friction-wheel will be gradually and positively lowered from the pulley $t^8$ during the dropping of the slide W and lever W', as the cam $W^2$ is turned back by or from the lowering rack V'.

It will be understood that the clamps hereinafter described will be applied to the bent shafts before the lever I is pushed rearward to slack off the formers B and bending bars or plates E G and press the friction-wheel $W^3$ to the pulley $t^8$ for running back the rack V' and chain H prior to removing the clamped shafts and placing another pair of shafts in the machine.

I particularly describe the shaft-clamps as follows: I employ a body and point clamp X and a heel-clamp Y. (Shown in Figs. 18, 19, and 20 of the drawings.) The body and point clamp X is made with a longitudinal center bar $x$, to the forward end of which is fixed a board or plate $x'$. The bar $x$ is provided with successively longer cross-bars $x^2$, which are bent downward at opposite ends to provide fingers $x^3$, which engage the outside faces of the two bent shafts. The plate $x'$ is provided at each side with a number—say three—of laterally-projecting arms $x^4$, which are adapted to bear on the inner sides or faces of the bent shafts, and at the two back corners of the clamp-plate $x'$ are fitted a couple of diverging bolt ends $x^6$, which have suitable nut-bearings on the plate and have down-bent outer ends forming fingers $x^7$, which overlap the outer sides of the extreme front ends or points of the two shafts. Vertical apertures or slots $x^8$ are made in the inner faces of the formers B B and through the outer faces of the formers C C and at the inner faces of the bending-bar heads $g$ $g$ to receive, respectively, the fingers $x^3$, ends of arms $x^4$, and bolt ends $x^6$ of the clamp X, while the pair of shafts X' X' are bent to the formers, as shown in Fig. 18 of the drawings The front clamp-bolt ends $x^6$ are adjustable in their nuts to allow their fingers $x^7$ to be set relatively to the adjacent arms $x^4$ to accommodate shafts of different thicknesses.

The heel-clamp Y is made with a clamping-head $y$, a flexible metal strap or band $y'$, a shoe or box bracket $y^2$, fixed to the outer end of the strap, and a hook-bar $y^3$, engaging the box $y^2$ and adapted to be hooked into a foot-block $y^4$, which is placed over the shafts which lie on the strap and may be set down against the shafts by a screw $y^5$, which is threaded into the top of the head $y$, said head being open at one side to admit the shafts. A recess $a^6$ in the machine-bed A receives that part of the clamp-head $y$ which is below the shafts. This heel-clamp Y is practically the same as the heel-bend clamp shown in my prior patent, and has a hole $z$ in its box-like end piece $y^2$, which receives a bolt or pin Z, fitted in the outer or end box-link $h$ of the chain H, as next described. This chain H is connected at its inner end to the bed A, and at its outer end link $h$ carries a stem $h'$, which enters a slot $v^2$ in the segmental rack, lug, or bracket $V^2$. I prefer to make the foot-blocks $y^4$ with elongated holes in each end, so that the block is reversible and may be placed in position without possibility of mistake. The holes are preferably elongated, so that the hook-bar $y^3$ will more readily engage with the foot-block $y^4$. (See Figs. 17, 18, and 19.)

The chain is made up of a series of blocks which support the shaft-heels or the clamp-straps $y'$ on which they rest. These blocks are connected by metal links, which are preferably pivoted within grooves of side flanges or walls of the blocks, the pivots ranging gradually higher from the inner toward the outer links of the chain or from below the face or bed of the innermost link to above the face or bed of the outermost link to cause the chain to automatically lengthen a little to accommodate the endwise stretching of the wooden shafts while their heels are being bent upward to the former D by the chain.

It is obvious as the chain is bent upward to press the shafts to the former D that the arm $h'$ of the outer chain-link $h$ will be withdrawn some little distance in the slot $v^2$ of the rack-arm $V^2$—say about two inches—this movement being due to the curvature given the chain and the location of the shaft or pivot $v'$ of the segmental rack $V'$ above the plane of the bending-chain on which the shafts rest. I avail myself of this withdrawal or endwise motion of the chain-arm $h'$ to cause the pin Z (above named) to automatically bend down and hold flat to the chain H the end box $y^2$ and strap $y'$ of the heel-clamp, which are disposed to curl upward after little use, and ordinarily have had to be pressed by hand flat to the bending-chain while the shafts were being put into the machine.

Figs. 12 and 13 of the drawings show the pin Z, fitted to slide in suitable bearings on the link-stem $h'$ and in the end wall of the link $h$, and preferably within a casing $z'$, fixed to the stem. The pin Z has a transverse pin or collar $z^2$, between which and the end wall of the link $h$ or other suitable resistance-piece is placed a spring $z^3$, which normally expands to press the pin Z outward to withdraw it from the hole $z$ in the clamp-strap box when the outer end of the pin is not confined by contact with the end wall of the rack-lug $V^2$ at one side of its slot $v^2$. With this construction it is obvious that when the chain H is approaching a flat position the gradual outward movement of the end chain-link $h$ and its stem $h'$ will cause the outer end of the pin Z to strike the end wall of the lug $V^2$ and force the pin Z inward as its spring $z^3$ yields and into the hole $z$ in the clamp-strap box $y^2$ to hold the strap flat to the bending-chain to receive the straight shafts, and as the chain is bent upward by the rack $V'$ the backward or downward slip of the link and stem $h$ $h'$ will free the outer end of the pin Z from the lug $V^2$ and allow the spring $z^2$ to expand and automatically withdraw the pin Z from the box $y^2$ to free the clamp and allow it and the bent shafts held by it to be easily removed from the machine. A pin $h^2$, passed through any one of a series of holes in the chain-link stem $h'$ behind the end wall of the rack-lug $V^2$, maintains loose connection of the lug and chain. A spiral spring 39 is placed on the stem $h'$ between the pin $h^2$ and the lug $V^2$ to keep the said stem in the normal position. (See Fig. 12.) A suitable collar is of course placed between the spring and the pin $h^2$.

As there is a tendency for the first joint in the chain H to bend too readily, I stiffen it with a spring 66, attached to the box-link $h$ and passing through a lug on the second link, as shown. (See Figs. 15 and 16.)

To prevent any possibility of the segmental rack $V'$ starting before the depression of the foot-lever $T^2$, a latch 40 is pivoted near the rear lower corner of the rack and engages with the edge of the bed of the machine. (See Figs. 6 and 11.) A lug is formed on this latch which is engaged, as shown, by the arm on the small shaft 42. The other end of this small shaft has an arm 43 connected to the arm 44 of the shaft $t^{12}$. This arm is provided with an adjustable weight to return the shaft to its normal position after the foot is taken from the foot-lever $T^2$. Thus when the foot-lever is pressed the arm 41 lifts the latch 40 and leaves the segmental rack $V'$ free to be raised through the further depression of the foot-lever $T^2$.

In order to ease the shock of the return of the segmental rack $V'$, a spring-buffer 45 is placed under its rear end. (See Fig. 25.)

In order that the machine may be readily lengthened or shortened to suit different lengths of shafts, the frame is made in two portions, of which the front portion is made to slide in suitable guideways formed in the rear portion at three different places, as shown. In Fig. 31 the construction of the slide, to which the clamp 46 is applied, is shown. The said clamp consists of a screw operated by a hand-wheel 46 and working in a suitable nut 47, rigidly connected to the female portion 48 of the slide. This screw bears against the disk 49 and jams the male portion 50 of the slide fast against the female portion 48. In Fig. 3 is shown the construction of the slide on the other side of the machine. A plain hole is formed in the female part 48 of the slide and a series of threaded holes in the male part 50. A screw 51 is adapted to pass through the hole in the female part and screwing into any desired hole in the male part securely clamp them together. The center slide is of similar construction.

In order to move the two parts of the machine closer together or farther apart, a shaft 52 is suitably fastened at one end on one of the guide-frames 24. The other end is screw-threaded and enters a barrel 53, journaled on the rear frame of the machine. The interior of the barrel at one end is also screw-threaded and the other end carries a hand-wheel 54, so that by the motion of the hand-wheel the shaft 52 may be moved either way, carrying the front portion of the machine with it. The front legs of the machine have suitable casters 55 to facilitate the motion. When the machine has been adjusted, so that the desired hole in the male part 50 is under the hole in the female part 48, the screws 51 are applied and the clamp 46 tightened, thus making the frame of the machine perfectly rigid.

It is necessary to make the connecting-rod $W^5$ and shipper-bar $S'$ longitudinally adjustable in consequence of the longitudinal adjustability of the machine.

In Fig. 24 is shown the method of holding the shipper-bar in a normal position. A lug $S^9$ on the under side of the bar slides on the shaft 71 between two springs $71^a$, held by adjustable stops $71^b$, which tend always to keep the shipper-bar in a central normal position.

I should have mentioned that the block 72, from which the former D is hung, slides in the standard $A^5$, and an adjustable screw-stop 73, provided with a hand-wheel, limits its upward movement, as may be desired, to suit different thicknesses of shafts.

In view of the aforesaid general description of the machine a comparatively brief statement of its operation in bending a pair of shafts will suffice, as follows: Before the shafts $X' X'$ are placed in the machine its parts will have the relative positions shown in full lines in Figs. 6 and 9 of the drawings—that is to say, the heel-bend clamp-head $y$ rests in the bed-recess $a^3$, and the clamp-strap $y'$ is held down flat to the bending-chain H by the pin Z entering the strap-box $y^3$, and the spreader-bars and bending bars or plates $E'$ E F G project straight toward the front end of the machine, as shown in Figs. 1 and 4 of the drawings, and the formers B will be spread apart by their springs $b^3$, which hold them against the upper ends of the levers $B^2$, which are now thrown forward, as shown in Figs. 1, 6, and 9 of the drawings. The point-formers C lie flush with the top of the bed or table A of the machine, and the wedge-bar J is in the normal position for starting to give the first bend to the shafts, or with its point a little behind the rollers E of the spreader-bars $E'$, to which the bending-bars are attached. When the two shafts $X' X'$ are laid on the bed A and bending-chain H and with the bending-bars E E lying together between them, the lever I will be pushed rearward, which will carry the rod 5 rearward to clamp the shafts endwise between the bending-chain box $h'$ and the shoulders $g^2$ of the end blocks $g$ of the bending-bars G, and at the same time the lever I will move the levers $B^2$ rearward to draw the front free ends of the first-bend formers B toward each other a little. The lever I will be engaged with its catch-plate $I^2$, which is fixed to the machine-bed to lock the parts in these positions. The lever U will next be swung down by hand to lower the heel-bend former and clamp the shafts between it and the bending-chain H. The movement of the lever I, through the rod $W^5$, lowered the friction-wheel $W^3$ a little farther from the driving-pulley $t^3$. It will be understood that the main driving-shaft T is being rotated by a belt (not shown) shipped from the loose pulley $T^3$ to the tight pulley $T^4$ on the shaft. All now being ready to give the first lateral bend to the pair of shafts, the lever S will be shifted forward in direction of the arrow 3, which will move the bar $S'$ rearward and carry the wheel $s^2$ on it to the belt $S^2$ and tighten it, thereby causing rotation of the shaft R from the gear-wheel $R^2$, and thereby rotating the pinion $r$, engaging the wedge-bar rack to drive said bar forward between the rollers $E^2 E^2$ and spread the bending-bars E E, and thereby bend the shafts $X' X'$ to the formers B B, respectively, the front bending bars or plates G G meanwhile sweeping or spreading outward over the bed A and the point-formers C C to positions outside these formers, and so that the end blocks $g$ of the bars G or the anti-friction rollers $g'$ thereon strike the lugs $o'$ of the column-levers O O, which then have the positions shown in Figs. 1 and 4 of the drawings. During the latter part of the forward movement of the wedge-bar J and while the straight side extensions $j' j'$ of the wedge $J'$ were moving between the rollers $E^2$ and holding the shafts to the formers B the wedge $J^2$ has passed over the rollers 17 on the column-levers O till the small end drops between them. By this time the wedges 8 have raised the formers C above the bed of the machine and the latch 12 has passed under the lever 11. The front stop 57 has prevented the wedge-bar traveling too far. All being now ready for the return or rearward stroke of the wedge-bar, the lever S is drawn rearward by the operator, which moves the bar $S'$ forward and slacks off the tightener $s^2$ from the belt $S^2$ and also carries the other wheel $s^3$ on the bar to the belt $S^3$ and tightens it, and thereby causes the shaft R and its pinion $r$ to turn in reverse direction from that first described. The wedge-bar now begins to travel rearward on its return stroke. The first effect is to cause the latch 12 to turn the lever 11 and spread the formers on the bed of the machine in their working position. Immediately the formers C are thus raised and shifted outward laterally, the wedge $J^2$ acts on the rollers $O^2$ of the column-levers O to separate them and cause the lever-lugs $o'$ $o'$ to approach each other, and by pressing on the blocks $g$ of the bending-bars G they draw the latter inward and force the points of the shafts to the formers C, and as the point-bends are completed the lever-latches 23 engage the catches 25 on the column-levers to lock the shafts to the formers, whereupon the lever S is released and brought back to normal position, thus again slackening the belt $S^3$. The wedge-bar J will be carried rearward until it is arrested by stop 57 and the spring 59 drops in front of it. It will be understood that, although the wedge $J'$ is not in contact with the first-bend rollers $E^2$ during the formation of the second bend, the shafts will be held to the first-bend formers by the leverage exerted at the point-formers. It will also be understood that the wedges S have left the formers C free to drop into the recess $a^3$ at the proper time. As soon as these two bends are given the shafts by the formers B C the body-clamps X will be applied to the shafts, the clamp-fingers $x^3$, arms $x^5$, bolt ends $x^6$ being placed into the apertures $x^8$, provided for them in the formers B C, and the bending-bar blocks $g$. All is now ready to give the heel-bend to the shafts by the chain H. To accomplish this, the treadle $T^2$ is pressed down, releasing the catch 40 and throwing the wheel $t^{10}$ to the belt $T'$ and tightening it, thereby revolving the drive-pulley $t^8$ and gearing $t^9$ $V^3$ V $v$ and causing the segmental rack $V'$ to swing forward and carry the chain H upward to bend the heels of both shafts $X'$ $X'$ up around the former D, the brake 35 stopping the rack at the proper time.

During the bending of the shafts to the former D the withdrawal of the chain-stem $h'$ in the rack-lug $V^2$ allows the spring $z^3$ to withdraw the pin Z from the box $y^2$ of the clamp-strap, and the crank-arm $w$ on the rack-shaft $v'$, through the rod connections $w^3$ $w^4$, shaft $w^6$, and cam $W^2$, will lift both lever $W'$ and slide W and carry the friction-wheel $W^3$ up about half-way to the face of the driving-pulley $t^8$. When the heel-bend is complete, the treadle $T^2$ will be released and the operator will hook the rod $y^3$ into the strap-box $y^2$ and the clamp-plate $y^4$, as shown in Figs. 18, 19, and 20 of the drawings, thereby completing the attachment of the heel-clamp to the bent shafts. To release the bent and clamped shafts from the machine, the lever I will be unlatched and swung forward, thereby drawing the levers B forward to allow the first-bend formers to relax their hold on or retreat a little from the shafts, and simultaneously the rod 5 will be moved forward to unclamp the shafts endwise by shifting the bars E G to disengage the shoulders $g^2$ on the bar-blocks $g$ from the point ends of the shafts. At the same time the latches 23 are drawn down through the action of the shaft $I'$ on the rods 26, allowing the column-levers O to be swung to their normal positions by their springs. The spring 59 also releases the wedge-bar J through the medium of the rod 61, and the lever 11 is operated to return the cam 10 to its normal position, allowing the formers C to be contracted by their springs and drop to their position in the recess $a^3$, and simultaneously the rod $W^5$ by draft on the arm 38 will turn the cam $W^4$, which by pressure on the lever $W'$ will lift the slide W and press the friction-wheel to the face of the pulley $t^8$, and thereby impart to it a rotation the reverse of that above described for raising the bending-chain H, and consequently will lower said chain to the bed and away from the bent shafts, which are retained in shape by the body and heel clamps X Y. During this downward motion of the heel-bending chain the rock-shaft arm $w^9$ will, through the connecting-rods $w^8$ $w^7$ and shaft $w^6$, turn the cam or eccentric $W^2$ to gradually lower both lever $W'$ and slide W and carry the friction-wheel $W^3$ away from the pulley $t^8$ after the downswinging segmental rack $V'$ has acquired sufficient momentum to fall by its own gravity and carry the bending-chain H with it and press it flat upon the bed A of the machine. During the downswing of the segmental rack $V'$ and the chain H the contact of the pin Z with the end wall of the rack-arm $V^2$ will force the pin inward through the end wall of the box-link $h$ of the chain H, ready to engage the hole $z$ of the box $y^2$ of the next clamp Y, placed in the machine to hold the clamp-strap $y'$ flat upon the bending-chain before placing the next pair of shaft-sticks in the machine. The former D is now raised by means of the lever U and the shafts removed and all is now ready for inserting, clamping, and bending the next pair of shafts in the manner above described.

To facilitate the extrication of the shafts at the proper time, I place at a suitable place under the points of the shafts two vertical sliding rods 67, connected at their inner ends by a cross-head 68. Upward motion is given these rods by the pivoted foot-lever 69, connected to the center of the cross-head, thus raising the shafts out of the bending-bars G E, which are then free to return to their normal position. Springs 70 draw the rods 67 down again when the foot-lever 69 is released.

It will be noticed that the end of the shaft R is journaled in a hanger 30. The end of the shaft carrying the guide-pulley J is also journaled in this hanger. The pinion $r$ slides on a feather on the shaft R, so that it may be thrown out of gear with the wedge-bar J when the machine is being adjusted for different lengths of shafts.

In Figs. 27 and 28 I show an attachment for bending tongues. This consists of a trough 62, which is fitted to the bed of the machine, as shown. The rear end of it fits between the ends of the bars E, which are spread apart for that purpose by operating the hand-wheel 2. The tongue is placed in the trough and the end pressure applied by the hand-wheel 63 and sliding block 64. The heel is bent on a suitable former in the same manner as the shafts, but the mechanism for operating the other bend-formers is disconnected, as only one bend is to be given the tongue.

What I claim as my invention is—

1. A shaft-bending machine having its frame constructed of two main parts, one of which carries the former for bending the front end of the shaft and the other part the former for shaping the rear end thereof, said parts being adjustable lengthwise, substantially as described.

2. A shaft-bending machine having its frame constructed of two main parts, one of which carries the former for bending one end of the shaft and the other part the former for shaping the rear end thereof, and means, substantially as described, for adjusting said parts to vary the distance between said rear and front formers, substantially as described.

3. A shaft-bending machine having its frame constructed of two main parts, one of which carries the former for bending one end of the shaft and the other part the former for shaping the rear end thereof, said parts being connected by slides and secured by clamps, substantially as described.

4. In a shaft-bending machine, a main frame made in two parts connected together by suitable slides 48 and 50, in combination with shaft 52, barrel 55, and suitable clamps 46 and 51, substantially as and for the purpose specified.

5. In a shaft-bending machine, the second-bend or point formers normally lying below the machine-bed, combined with a wedge-bar carrying wedges which raise the formers, and a spring-latch engaging with an arm on a cam-shaft carrying a cam which presses the said formers outward and braces them laterally, substantially as and for the purpose specified.

6. In a shaft-bending machine, the second-bend or point formers normally lying below the machine-bed and supported for vertical and lateral movements, combined with springs normally drawing the formers inward, and a cam mounted on a partially-revolving shaft to spread them apart after they are raised above the bed, substantially as herein set forth.

7. In a shaft-bending machine, the combination, with a bed or table, of a pair of first-bending formers pivoted thereon at one end, a pair of second-bend or point formers, presser-bars adapted to bend the shafts to the formers, a cam fixed on a shaft journaled in the supporting-plate, a lever fast on the shaft, and a sliding bar carrying a wedge separating the spreading-bars and presser-bars to press the shafts to the first-bend formers, said wedge-bar having a spring-latch actuating the lever, shaft, and cam, which spread the second-bend formers, substantially as herein set forth.

8. In a shaft-bending machine, the combination, with a bed or table, of a pair of first-bend formers pivoted thereon at one end, a pair of second-bend or point formers normally lying below the machine-bed and adjustable vertically and laterally, presser-bars adapted to bend the shafts to the formers, a pair of spreader-bars separating the first-bend formers, and a sliding bar carrying a wedge separating the spreader-bars and presser-bars, said wedge-bar having wedges to raise the point-formers through their supporting-plate and its legs, and a spring-latch to subsequently spread the point-formers by means of their lever, cam-shaft, and cam, substantially as and for the purpose specified.

9. In a shaft-bending machine, the second-bend formers C, sliding in a plate 7, having legs 6ª, a cam 10, cam-shaft, and lever 11, in combination with wedge-bar J, carrying wedges 8, and spring-latch 12, substantially as and for the purpose specified.

10. In a shaft-bending machine, the combination, with the point-formers C, cam 10, cam-shaft, and lever 11, of the rock-shaft I', carrying an arm 13, connected suitably, as shown, to the said lever 11, and means for operating said shaft I', substantially as and for the purpose specified.

11. In a shaft-bending machine, the combination, with the point-formers and presser bars or plates adapted to bend the shafts to them, of levers adapted to the presser-bars, and a wedge pivoted on a sliding bar, so that in sliding heel first it will rise over the ends of the levers and will then drop in front of them, ready for operation on its return movement, substantially as and for the purpose specified.

12. In a shaft-bending machine, the combination, with first and second bend formers, spreader-bars, bending-bars, and levers adapted to press the shafts to the formers, and latches retaining the bent shafts at the second-bend formers, substantially as specified, of a shaft I', having crank-arms 6 $i'$ 27, a rod 5, connecting the arm 6 to the presser-bars E through arm 4, the segmental rack 3 and block $e'$, to which the bars E are suitably connected, levers B², and rods B', connecting the levers to the shaft crank-arms $i'$, said arms 27 located to disengage the second-bend-lever latches, substantially as described, whereby as the shaft I' is rocked the bent shafts will be unclamped endwise and laterally to loosen them for removal from the machine, substantially as and for the purpose specified.

13. In a shaft-bending machine, the combination, with a segmental rack operating the shaft-heel-bending devices, of a crank-arm on the segment-shaft, a pulley driving the gearing actuating said segment, a lever, a shaft carrying a cam or eccentric sustaining the free end of the lever, a crank-arm on the cam-shaft, rod connections from the cam-shaft crank-arm to the segment-shaft crank-arm for raising or lowering the lever as the segment is raised or lowered, a slide on the first-named lever, a cam journaled in the slide and bearing on the lever, and a friction-wheel on the slide adapted to the driving-pulley of the segmental rack, substantially as described, whereby as said rack is raised both lever and slide will be raised to move the slide friction-wheel part way to the rack-driving pulley and said wheel will be pressed to the pulley by subsequent operation of the slide-cam on the lever and both lever and slide with the friction-wheel will be carried from the rack-driving pulley automatically as the rack is lowered or retracted, as and for the purposes herein set forth.

14. In a shaft-bending machine, the combination, with the machine bed and frame, of a flexible device bending the heel of the shafts, a segmental rack V', connected to said flexible device for operating it, a crank-arm $w^9$ on the segment-shaft, a lever W', fulcrumed at $w^3$ to the machine-frame, a shaft $w^6$ on the frame and cam $W^2$ on the shaft $w^6$ and under the free end of the lever W', a slide W on the lever W', a friction-wheel $W^3$ on the lever W', adapted to the driving-pulley of the segmental rack, a cam 36, journaled in the slide W and bearing on the lever W', a pulley $w$, revolving with wheel $W^3$, a pulley $t^3$ on a main driving-shaft, and a loose belt $T^2$, connecting the pulleys $t^{13}$ $w$, all arranged for operation substantially as described, for the purposes set forth.

15. In a shaft-bending machine, the combination, with the machine bed and frame, bend-formers and devices clamping the said shafts to said formers, a shaft, a lever thereon, tappet-arms on the shaft, and connections from said arms to the shaft-bending bars, formers, and levers for unclamping the bent shafts from the formers, of a driving-pulley actuating the heel-bend-forming device, a slide carrying a friction-pulley adapted to said driving-pulley, a cam on the friction-wheel slide, and a rod connecting the cam with the lever on the shaft carrying the tappet-arms, substantially as described, whereby as the tappet-arm shaft is rocked by its lever to free the bent shafts from the formers the driving-wheel of the shaft-bending device will be engaged by the friction-wheel on the cam-lever for retracting the shaft-heel-bending device, as herein set forth.

16. In a shaft-bending machine, the combination, with the machine bed and frame, body, point, and heel-formers thereon, of flexible bars and levers pressing the shafts to these formers, a shaft I', provided with arms 6 $i'$ 27, a rod 5, connecting the arm 6 with the endwise-movable bending-bars through the arm 4, segmental rack 3 and block $e'$, to which the bars E are suitably connected, levers $B^2$ behind the body-formers, bars B', connecting said levers $B^2$ with the shaft-arms $i'$, latches P, holding the bending-bars to the point-formers and adapted for operation by the shaft-arms $i^2$, a lever I on the shaft I', a segmental rack V', connected to the heel-bending device, a crank-arm $w^9$ on the segment-shaft, a lever W', fulcrumed at $w^3$ to the machine-frame, a shaft $w^6$ on the frame, a cam $W^2$ on the shaft $w^6$ and under the free end of the lever W', a slide W on the lever W', a friction-wheel $W^3$ on the slide W, adapted to the driving-pulley of the segmental rack, a cam 36, journaled in the slide W and bearing on the lever W', and a rod $W^5$, connecting the cam 36 with the lever I', all arranged for operation substantially as described, for the purposes set forth.

17. In a shaft-bending machine, the combination, with the movable first-bend formers B and devices for operating the same, of the presser-bars E, so connected to the frame of the machine as to be adjustable closer to or farther from the formers B to suit different thicknesses of shafts, substantially as and for the purpose specified.

18. In a shaft-bending machine, the combination, with the movable first-bend formers B and devices for moving the same, of the bending-bars E, nuts $e$, blocks $e^2$, and right and left hand threaded screw $l$, operated in any suitable way, substantially as and for the purpose specified.

19. In a shaft-bending machine, the combination, with the point-formers C, of the presser-bars G, operated by levers having adjustable arms to regulate the inward throw of the presser-bars C for different thicknesses of shafts when said levers are operated by the wedge $J^2$, substantially as and for the purpose specified.

20. In a shaft-bending machine, the combination, with the point-formers C, of the presser-bars G, operated by levers O, having a lower arm 19 in two parts, one rigid with the upper arm 18 and the other engaging with the wedge $J^2$, adjustable on it by means of set-screw 21, substantially as and for the purpose specified.

21. In a shaft-bending machine, and in combination with the formers thereof, a sliding bar J, operating said formers and having a lug 56, and a fixed shaft 52, having stops 57, substantially as and for the purpose specified.

22. In a shaft-bending machine, and in combination with the formers thereof, a sliding bar J, operating said formers and having a lug 56, a shaft 52, stops 57, and spring-stop 59 on guide-frame 24, co-operating with the lug on the sliding bar, substantially as and for the purpose specified.

23. In a shaft-bending machine, and in combination with the formers thereof, a sliding bar J, operating said formers, a stop 59 on guide-frame 24, rod 61, engaging with spring-stop 59, tappet-arm 60, operating said rod, and shaft I', carrying said arm 60, substantially as and for the purpose specified.

24. In a shaft-bending-machine, and in combination with the heel-bending chain, the pulley $t^8$, the ratchet-brake 35, the oscillating segmental rack V', and intermediate connections between the rack and brake, pressing said brake 35 against the pulley $t^3$, substantially as and for the purpose specified.

25. In a shaft-bending machine, and in combination with the heel-bending chain H, the pulley $I^8$, the oscillating segmental rack $V'$, having an adjustable lug 31 thereon, of an arm 32, shaft 33, arm 34, and ratchet-brake 35, substantially as and for the purpose specified.

26. In a shaft-bending machine, and in combination with the heel-bending chain and the bed thereof, the segmental rack $V'$, a latch 40, pivoted on said rack and engaging with said bed, and mechanism, substantially as described, for releasing said latch, as set forth.

27. In a shaft-bending machine, and in combination with the heel-bending chain and the bed thereof, the segmental rack $V'$, a latch 40, pivoted thereon and engaging with said bed, and crank 42, having two arms, one of which engages the latch with shaft $t^{12}$, having arm 44 and lever $T^5$, and a connection between arm 44 and the arm 43 on shaft 42, substantially as described.

28. In a shaft-bending machine, and in combination with the formers thereof, the rods 67, set in guides on the frame of the machine, and cross-head 68, connecting said rods, the pivoted lever 69, connected to the cross-head, and springs 70 on said rods 67, substantially as and for the purpose specified.

29. In a shaft-bending machine, a heel-bending chain, in combination with a spring arranged to stiffen the joint between the outer two links, substantially as and for the purpose specified.

30. In a shaft-bending machine, the heel-bending chain H, its outer link provided with a stem $h'$, in combination with lug $V^2$ and segmental rack $V'$, the said stem $h'$ being provided with a spring 39, so arranged as to tend to keep the stem $h'$ and lug $V^2$ in a normal position as regards one another, substantially as and for the purpose specified.

THOS. E. MONTAGUE.

In presence of—
    JAMES M. GLENN,
*Of St. Thomas, Canada, Barrister-at-Law.*
    WILLIAM L. WICKETT,
*Of St. Thomas, Student-at-Law.*